United States Patent [19]

Hinnenkamp et al.

[11] 4,376,757
[45] Mar. 15, 1983

[54] SYNTHETIC CRYSTALLINE SILICATE COMPOSITIONS AND PREPARATION THEREOF

[75] Inventors: James A. Hinnenkamp; Vernon V. Walatka, Jr., both of Cincinnati, Ohio

[73] Assignee: National Distillers & Chemical Corp., New York, N.Y.

[21] Appl. No.: 256,297

[22] Filed: Apr. 22, 1981

Related U.S. Application Data

[63] Continuation-in-part of Ser. No. 92,127, Nov. 7, 1979, Pat. No. 4,331,641.

[30] Foreign Application Priority Data

Oct. 23, 1980 [CA] Canada ................................. 363052

[51] Int. Cl.³ ..................... C01B 33/20; C01B 33/32
[52] U.S. Cl. .................................... 423/332; 252/459; 260/429 R; 260/439 R; 423/326; 423/335; 556/400; 585/733
[58] Field of Search ....................... 423/277, 326–333; 252/431 W, 432, 454, 455 Z, 459; 260/429 R, 439 R; 556/400

[56] References Cited

U.S. PATENT DOCUMENTS

| | | | |
|---|---|---|---|
| 3,941,871 | 3/1976 | Dwyer et al. | 423/326 |
| 4,061,724 | 12/1977 | Grose et al. | 423/335 |
| 4,086,186 | 4/1978 | Rubin et al. | 423/329 |
| 4,104,294 | 8/1978 | Grose et al. | 260/448 C |
| 4,208,305 | 6/1980 | Kouwenhoven et al. | 423/326 X |

FOREIGN PATENT DOCUMENTS

| | | | |
|---|---|---|---|
| 2831611 | 2/1980 | Fed. Rep. of Germany | 252/455 Z |
| 2024790 | 1/1980 | United Kingdom | 423/326 |
| 2033358 | 5/1980 | United Kingdom | 423/328 |

OTHER PUBLICATIONS

Bibby et al. "Nature" vol. 280, Aug. 23, 1979, pp. 664–665.

*Primary Examiner*—Edward J. Meros
*Attorney, Agent, or Firm*—Kenneth D. Tremain

[57] ABSTRACT

New crystalline silicate compositions are prepared from a silica containing mixture which is substantially free of aluminum ions and contains a source of choline by digesting a reaction mixture comprising a choline salt, sodium hydroxide, potassium hydroxide, an oxide of silicon, water and, optionally, a Group VIII metal salt with the reaction mixture containing less than about 1000 ppm aluminum. These crystalline silicates exhibit a distinctive X-ray diffraction pattern and have a composition as expressed in terms of its oxides, as follows:

$$(0\text{--}50)\ R_2O: (0\text{--}50)\ M_{\frac{2}{m}}O: (0\text{--}30)\ Z_{\frac{2}{z}}O: 100\ SiO_2: (0\text{--}200)\ H_2O$$

where R is the organic nitrogen-containing cation derived from choline, M is an alkali metal ion, ammonium, hydrogen, a metal cation or mixtures thereof, m is the valence of M, Z is a Group VIII metal cation and z is the valence of said Group VIII metal cation. These crystalline silicates are usefully employed as catalysts in hydrocarbon conversions.

8 Claims, No Drawings

SYNTHETIC CRYSTALLINE SILICATE COMPOSITIONS AND PREPARATION THEREOF

CROSS-REFERENCE TO RELATED APPLICATIONS

This application is a continuation-in-part of application Ser. No. 092,127, filed Nov. 7, 1979, now U.S. Pat. No. 4,331,641.

BACKGROUND OF THE INVENTION

1. Field of the Invention

The present invention relates to new crystalline silicate compositions. Further, this invention relates to methods for producing these new crystalline silicate compositions using choline salts and to a method for activating them to enhance their usefulness for certain catalytic conversion processes.

2. Description of the Prior Art

Zeolitic materials, both natural and synthetic, are known to have catalytic capability for various types of reactions, especially hydrocarbon conversions. The well-known crystalline aluminosilicate zeolites are commonly referred to as "molecular sieves" and are characterized by their highly ordered crystalline structure and uniformly dimensioned pores, and are distinguishable from each other on the basis of composition, crystal structure, adsorption properties and the like. The term "molecular sieves" is derived from the ability of the zeolite materials to selectively adsorb molecules on the basis of their size and form.

The processes for producing such crystalline synthetic zeolites are well known in the art. A family of crystalline aluminosilicate zeolites, designated ZSM-5, is disclosed in U.S. Pat. No. 3,702,886, said patent being incorporated herein by reference.

U.S. Pat. No. 3,941,871 relates to novel crystalline metal organosilicates which are essentially free of Group IIIA metals, i.e., aluminum and/or gallium. This patent is incorporated herein by reference. It is noted therein that the amount of alumina present in the known zeolites appears directly related to the acidity characteristics of the resultant product and that a low alumina content has been recognized as being advantageous in attaining a low degree of acidity which in many catalytic reactions is translated into low coke making properties and low aging rates. A typical procedure for making the organosilicates is to react a mixture containing a tetraalkylammonium compound, sodium hydroxide, an oxide of a metal other than a metal of Group IIIA, an oxide of silicon, and water until crystals of said metal organosilicates are formed. It is also noted in the patent that the family of crystalline metal organosilicates have a definite X-ray diffraction pattern which is similar to that for the ZSM-5 zeolites. Minor amounts of alumina are contemplated in the patent and are attributable primarily to the presence of aluminum impurities in the reactants and/or equipment employed.

U.S. Pat. No. 3,884,835 discloses crystalline silica compositions. The crystalline silica materials may also contain a metal promoter which may be selected from Group IIIA, Group V B or Group VI B elements.

U.S. Pat. No. 4,088,605 is directed to the synthesis of a zeolite, such as ZSM-5, which contains an outer shell free from aluminum. The patent states at column 10, line 20 et seq., that to produce the outer aluminum-free shell it is also essential that the reactive aluminum be removed from the reaction mixture. It is therefore necessary, as noted therein, to process the zeolite and to replace the crystalization medium with an aluminum-free mixture to obtain crystalization of SiO2 on the surface of the zeolite which can be accomplished by a total replacement of the reaction mixture or by complexing from the original reaction mixture any remaining aluminum ion with reagents such as gluconic acid or ethylenediaminetetraacetic acid (EDTA).

Crystalline borosilicate compositions are disclosed in German Offenlegungschriften No. 2 746 790. This application relates specifically to borosilicates which are prepared using the usual procedures for making the aluminosilicate zeolites. It is noted therein that in instances where a deliberate effort is made to eliminate aluminum from the borosilicate crystal structure because of its adverse influence on particular conversion processes, the molar ratios of SiO2/Al2O3 can easily exceed 2000–3000 and that this ratio is generally only limited by the availability of aluminum-free raw materials.

U.S. Pat. Nos. 4,079,096 and 4,086,186 are concerned with the preparation and use of a crystalline aluminosilicate zeolite designated as ZSM-34. This zeolite has a characteristic X-ray diffraction pattern and a composition, as synthesized and in anhydrous form expressed in mole ratio of oxides as follows:

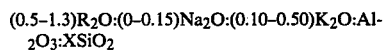

where R is the organic nitrogen-containing cation derived from choline and X is 8 to 50. ZSM-34 is disclosed as a catalyst for the conversion of methanol, dimethyl ether or mixtures thereof to a hydrocarbon product rich in ethylene and propylene.

While the art has provided zeolitic catalysts having a wide variety of catalytic and adsorbtive properties, the need still exists for crystalline materials having different and/or enhanced catalytic properties. For example, an important use for a crystalline material is in conversion processes of oxygenated compounds such as the conversion of dimethyl ether and/or methanol to aliphatic compounds, as well as conversion of synthesis gas to hydrocarbons, at a significant level of conversion and selectivity.

It is an object of this invention to provide novel crystalline silicate compositions.

It is another object of this invention to provide novel crystalline silicate compositions having different and enhanced catalytic properties.

It is a further object of this invention to provide a method of preparing novel crystalline silicate compositions from mixtures of appropriate oxides, together with a choline salt.

It is a still further object of this invention to provide an improved method for the conversion of oxygenated organic compounds to useful end products at significant conversion rates and product selectivity.

SUMMARY OF THE INVENTION

These and other objects are achieved herein by providing crystalline metal silicates which are substantially free of aluminum, e.g., containing less than about 1000 wppm (weight parts per million) of aluminum and which can be identified in terms of the moles of its oxides as follows:

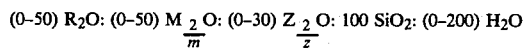

where R is the organic nitrogen-containing cation derived from choline, M is an alkali metal cation, ammonium, hydrogen, a metal cation or mixtures thereof, m is the valence of M, Z is a Group VIII metal cation and z is the valence of said Group VIII metal cation. The crystalline silicate of this invention has an X-ray diffraction pattern as set forth in Table I herein.

The crystalline silicate which is the subject of this invention may be prepared by a method which comprises: preparing a mixture containing a choline salt, sodium hydroxide, potassium hydroxide, silica and water, said mixture having an aluminum content of less than about 1000 wppm (based on silica) and having a composition in terms of mole ratios of oxides, falling within the following ranges:

| | |
|---|---|
| $OH^-/SiO_2$ | 0.05–3 |
| $H_2O/OH^-$ | 10–800 |
| $K_2O/M_2O$ | 0.01–1 |
| $R^+/(R^+ + M^+)$ | 0.01–1 | where $R^+$ is choline cation and $M^+$ is sodium ion plus potassium ion, maintaining the mixture at a temperature of about 50° to about 250° C. until crystals of said silicate are formed and separating and recovering said crystals.

Oxygenated hydrocarbons, such as methanol, dimethyl ether and mixtures thereof may be converted to hydrocarbons by contacting said oxygenated hydrocarbons, under conversion conditions with the crystalline silicate composition of this invention. In a similar fashion, synthesis gas comprising hydrogen and carbon monoxide, may be converted to hydrocarbon and/or oxygenated compounds by contacting said synthesis gas, under conversion conditions with the crystalline silicate composition of this invention.

DESCRIPTION OF THE PREFERRED EMBODIMENTS

The present invention relates to a class of crystalline silicate compositions. These crystalline compositions are prepared by a process which requires that the amount of aluminum in the reaction mixture be carefully controlled and further that a choline salt be present in the reaction mixture. Of particular interest is a silicate composition which includes a Group VIII metal oxide, such as ruthenium oxide, or iron oxide, in its composition.

In accordance with the present invention there are provided crystalline metal silicates which are substantially free of aluminum i.e., containing less than about 1000 wppm (weight parts per million) and which can be identified in terms of the mole ratios of oxides as follows:

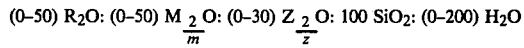

where R is the organic nitrogen-containing cation derived from choline, M is an alkali metal cation, ammonium, hydrogen, a metal cation or mixtures thereof, m is the valence of M, Z is a Group VIII metal cation and z is the valence of of said Group VIII metal cation. In a preferred form M is sodium, potassium or mixtures thereof and Z is ruthenium or iron.

Members of the family of crystalline silicate compositions of the invention possess a definite crystalline structure. The X-ray diffraction powder pattern of the dried crystalline material of this invention shows many crystalline peaks which do not match the pattern for any known crystalline silica or zeolite. The major peaks observed are as follows:

TABLE I

| Interplanar Spacing d(A°) Observed | Relative Intensity 100 $I/I_o$ | Relative Intensity |
|---|---|---|
| 10.90 | 100 | VS |
| 7.02 | 14 | W |
| 5.09 | 19 | W |
| 4.32 | 55 | MS |
| 4.17 | 12 | W |
| 3.97 | 21 | M |
| 3.66 | 38 | M |
| 3.53 | 98 | VS |
| 3.35 | 48 | MS |
| 3.32 | 48 | MS |
| 3.23 | 31 | M |
| 2.88 | 10 | W |
| 2.78 | 5 | VW |
| 2.62 | 10 | W |
| 1.97 | 17 | W |
| 1.88 | 10 | W |
| 1.85 | 14 | W |

These values were determined by standard X-ray diffraction powder techniques. The radiation was the K-alpha doublet of copper, and a scintillation counter spectrometer with a strip chart pen recorder was used. The peak heights, I, and the positions as a function of $2\theta$, where $\theta$ is the Bragg angle, were read from the spectrometer chart. From these, the relative intensities 100 $I/I_o$ where $I_o$ is the intensity of the strongest line or peak, and d(obs.), the interplanar spacing in A. corresponding to the recorded lines, were calculated. In Table I the relative intensities are given in terms of the symbols as follows: VW=very weak (less than 10), W=weak (10–19), M=medium (20–39), MS=medium strong (40–70) and VS=very strong (greater than 70). Ion exchange of the cation M with other cations reveals substantially the same pattern with some minor shifts in interplanar spacing and variation in relative intensity. Other minor variations can occur depending on the metal to silicon ratio of the particular sample and on whether it had been subjected to thermal treatment.

The silicates of this invention can be prepared by heating a reaction mixture comprising choline cation, e.g. from choline, or a soluble choline salt such as choline chloride, alkali metal ion, e.g. from sodium hydroxide, potassium hydroxide or mixtures thereof, silicon ion, e.g. from silica, water and less than 1000 wppm of aluminum (based on silica), said mixture usually having a composition in terms of mole ratios falling with the following ranges.

| | Broad | Preferred |
|---|---|---|
| $OH^-/SiO_2$ | 0.05–3 | 0.2–0.9 |
| $H_2O/OH^-$ | 10–800 | 20–500 |
| $K_2O/M_2O$ | 0.01–1 | 0.1–1 |
| $R^+/(R^+ + M^+)$ | 0.01–1 | 0.03–0.9 | where $R^+$ is the choline ion $[(CH_3)_3N—CH_2CH_2OH]^+$ and $M^+$ is $(Na^+ + K^+)$ and maintaining the mixture at elevated temperature for a time sufficient to form crystals of the product. Typical reaction conditions consist of heating the reaction mixture at elevated temperature, e.g., about 50° to about 250° C., and even higher, for a period of time of from about 6 hours to as much as 60 days. The preferred temperature is from about 100° to about 190° C. for time periods of from about 1 to about 16 days. The reaction mixture can be heated at elevated pressure as in an autoclave, or at normal pressure, e.g. as by refluxing. The preferred method of heating the reaction mixture is at reflux temperature.

As is common practice in the production of silicate compositions, when reflux heating of the reaction mixture is employed large amounts of sodium chloride along with some sulfuric acid, are added to the reaction mixture to ensure crystallization of the product. Thus, in reflux preparation, the ratios of $OH^-/SiO_2$, and like ratios tend to result in values different from the ratios of the autoclave processing.

Of course, in the preparation of the reaction mixture for the heating step, the reaction mixture is maintained substantially free of aluminum, i.e., containing less than 1000 wppm (based on silica).

In an optional and preferred embodiment, the reaction mixture additionally contains a Group VIII metal ion, e.g. from a soluble Group VIII metal salt. Particularly preferred Group VIII metals are ruthenium and iron. Therefore, such salts as ruthenium trichloride, ruthenium tetrachloride, ruthenium sulfite acid ($H[Ru(OSO_2H)_2OH]$), ruthenium nitrate, ferrous chloride, ferric chloride, and the like may be employed in this embodiment. When a Group VIII metal ion is present, the reaction mixture forms a composition, in terms of mole ratios, as set forth hereinbefore plus an additional mole ratio falling within the following range:

|  | Broad | Preferred |
|---|---|---|
| $Z_{2/z}O/SiO_2$ | 0–0.3 | 0–0.12 |

The digestion of the gel particles is carried out until crystals form. The solid product is separated from the reaction medium, as by cooling the whole to room temperature, filtering, and water washing.

The foregoing product is dried, e.g., at 110° C. for from about 8 to 24 hours or longer. Of course, milder conditions may be employed if desired, e.g., room temperature under vacuum.

An important feature of the invention is a process for activating the novel crystalline composition of the invention for enhanced use in various conversion processes. In general, the activation procedure comprises:

(a) Heat treating the dried silicate composition at e.g., about 200° to about 900° C., preferably about 400° to about 600° C. for about 1 to about 60 hours, preferably about 10 to about 20 hours in a molecular oxygen containing atmosphere.

In a preferred embodiment, the activation procedure comprises:

(1) Heat treating the dried silicate composition at e.g., about 200° to about 900° C., preferably about 400° to about 600° C. for about 1 to about 60 hours, preferably about 10 to about 20 hours;

(2) Ion exchanging the heat treated silicate composition with a material which upon further heat treating decomposes to provide a composition having a hydrogen cation;

(3) Washing and drying the exchanged silicate composition;

(4) Heat treating the dried silicate using the procedure of step (1);

It will be appreciated by those skilled in the art that steps (1)–(4), inclusive of the preferred embodiment, and step (a), above, are well-known and represent a method commonly used to activate zeolite type catalysts. The composition of the invention may be suitably employed in the form obtained after step 4 or after step a. Heat treating may be done in any atmosphere as is known in the art and is preferably done in air.

Where desired, the activation procedure may, optionally, include the Redox Treatment disclosed in commonly assigned patent application Ser. No. 092,127, filed Nov. 7, 1979, said application being incorporated herein by reference. This treatment includes a heat treatment conducted with a reducing agent and is practiced, following step (a) or step (4) of the above activation procedures, as follows: (b) or (5) Treating the heated silicate composition with a reducing agent for about 1 to about 80 hours, preferably about 2 to about 40 hours, at about 200° to about 900° C., preferably about 400° to about 600° C., and (c) or (6) Heat treating the reduced silicate using the procedure of step (a) or (1), respectively.

Any reducing agent may be used or a compound which under the treatment conditions forms a reducing agent, such as dimethylether. Dimethylether and hydrogen are preferred because of their demonstrated effectiveness.

The activation procedure disclosed herein which does not include the "Redox Treatment" provides a catalytically active composition which exhibits useful levels of conversion and selectivity in the reactions catalyzed by the compositions of this invention and is the preferred activation procedure. Although the inclusion of the "Redox Treatment" is not necessary to provide a useful catalyst, subjecting the compositions of this invention to Redox Treatment following oxidative activation may provide some alteration in the selectivity, usually minor in nature. Therefore, where economically justified or where slight alteration in selectivity is required, Redox Treatment may be utilized.

As noted hereinabove, and as known in the art, the procedure for preparing zeolites, e.g., aluminosilicates, is well-known. It is an essential feature of the present invention however, that the crystalline silicate composition be prepared using a reaction mixture containing, based on weight percent silica, less than about 1000 wppm aluminum ions, preferably less than about 500 wppm and a source of choline cation, such as a soluble choline chloride or nitrate. Aside from other differences with prior art crystalline silica compositions, the silicate compositions formed herein are substantially free of aluminum with the molar ratio of $SiO_2/Al_2O_3$ being greater than about 800, and even 3,000.

It is not known why the crystalline compositions of this invention provide such unexpected properties as low dimethyl ether reactivity, significant activity with methanol coupled with good dimethyl ether selectivity at low pressure and a highly unexpected product slate from the reaction of synthesis gas, particularly if cofed with water. Crystalline compositions not prepared using both a low aluminum level and choline salt do not have these properties and cannot be activated to provide a crystalline composition having these enhanced catalytic hydrocarbon or oxygenated compound conversion properties, among others. It is possible to theorize that at low aluminum levels the choline ion becomes entrapped as the [—O—Si—O—Si—O—]$_n$ chains crystallize to form the three dimensional crystal network. Subsequent thermal treatment may create cavities which have an internal surface modified by the choline ion.

In preparing the crystalline compositions of the invention it is important that substantially aluminum-free raw materials be employed. The substantially aluminum free silica source can be any of those commonly considered for use in synthesizing zeolites such as powdered solid silica, silicic acid, colloidal silica or dissolved silica. A preferred silica source is Cab-O-Sil, sold by Cabot Co.

The substantially aluminum free alkali metal hydroxide material is sodium hydroxide, potassium hydroxide and mixtures thereof.

The substantially aluminum free choline salt can be any of the soluble choline salts available, such as choline chloride and the like.

Where a Group VIII metal salt is employed, it too should be substantially aluminum free. Among the useful Group VIII metals are iron, cobalt, nickel and ruthenium with ruthenium and iron being particularly preferred in such forms as ruthenium tri or tetra chloride, ruthenium nitrate, ruthenium sulfite acid, ferrous chloride, ferric chloride, and the like.

The specific crystalline compositions described, when evaluated for catalytic properties without having been calcined, are inactive, possibly because the intracrystalline free space is occupied by organic cations from the forming solution. They may, however, be activated by heat treatment using known techniques such as heating in an inert atmosphere or air at about 200° to about 900° C., for 1 to 60 hours. This may be followed by ion exchange with ammonium salts and further heat treatment at about 200° to about 900° C. if desired.

The crystalline compositions can be used either in the alkali metal form e.g., the sodium form, the ammonium form, the hydrogen form, or other univalent or multivalent cationic form. Preferably, either the ammonium or hydrogen form is employed. They can also be used in intimate combination with hydrogenating components such as tungsten, vanadium, copper, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such components can be impregnated in or on to the present catalyst such as, for example, in the case of platinum, by treating the crystalline composition with a platinum metal-containing ion. Thus, suitable platinum compounds include chloroplatinic acid, platinous chloride and various compounds containing the platinum amine complexes.

The catalyst, when employed either as an adsorbent or as a catalyst in one of the aforementioned processes, may be heat treated as described hereinabove.

Members of the present family of crystalline compositions can have the original cations associated therewith replaced by a wide variety of other cations according to techniques well-known in the art. Typical replacing cations would include hydrogen, ammonium and metal cations including mixtures of the same. Of the replacing metallic cations, particular preference is given to cations of metals such as rare earth metals, manganese and calcium as well as metals of Group IIB of the Periodic Table, e.g., zinc and Group VIII of the Periodic Table, e.g., nickel. These replacing cations are included within the definition of M in the formula employed herein to describe the compositions of this invention.

Typical ion exchange techniques include contacting the members of the family of crystalline silicates with a salt solution of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249, 3,140,251 and 3,140,253, which are incorporated herein by reference.

Following contact with the salt solution of the desired replacing cation, the crystalline compositions are then preferably washed with water and dried at a temperature ranging from about 65° C. to about 315° C. and thereafter heat treated as previously described.

Regardless of the cations replacing the sodium in the synthesized form of the catalyst, the spatial arrangement of the atoms which form the basic crystal lattices in any given composition of this invention remain essentially unchanged by the described replacement of sodium or other alkali metal as determined by taking an X-ray powder diffraction pattern of the ion-exchanged material. For example, the X-ray diffraction pattern of several ion-exchanged compositions reveal a pattern substantially the same as that set forth in Table 1.

The compositions prepared by the instant invention are formed in a wide variety of particular sizes. Generally speaking, the particles can be in the form of a powder, a granule, or a molded product, such as extrudate having a particle size sufficient to pass through a 2 mesh (Tyler) screen and be retained on a 100 mesh (Tyler) screen. In cases where the catalyst is molded, such as by extrusion, the composition can be extruded before drying or dried or partially dried and then extruded.

In the case of many catalysts, it is desired to incorporate the composition of this invention with another material resistant to the temperatures and other conditions employed in organic conversion processes. Such materials include active and inactive materials and synthetic or naturally occurring crystalline compositions as well as inorganic materials such as clays, silica and/or metal oxides. The latter may be either naturally occurring or in the form of gelatinous precipitates or gels including mixtures of silica and metal oxides. Use of a material in conjunction with the present catalyst tends to improve the conversion and/or selectivity of the catalyst in certain organic conversion processes. Inactive materials suitably serve as diluents to control the amount of conversion in a given process so that products can be obtained economically and in orderly manner without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, etc. function as binders for the catalyst. It is desirable to provide a catalyst having good crush strength, because in a chemical process the catalyst is often subjected to handling or use which tends to break the catalyst down into powder-like materials which cause problems in processing. These clay binders have been employed for the purpose of improving the crush strength of the catalyst.

In addition to the foregoing materials, the catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel.

The following examples are presented as specific embodiments of the present invention and show some of the unique characteristics of the claimed crystalline compositions and are not to be considered as constituting a limitation on the present invention.

EXAMPLE I

This example illustrates a method of preparing a silicate composition of the present invention.

Sixty-dive grams of water were added to 195 grams of colloidal silica (Ludox AS-40 40% $SiO_2$) reducing the silica content to 30% by weight. A solution of 30 g of 50% NaOH, 16.9 grams of 45.4% KOH, 76 grams of choline chloride and 150 ml water was slowly added to the silica solution. The mixture was placed in a polypropylene flask which was partially immersed in a hot oil bath at 120° C. A reflux condenser was attached to the flask. After 35 days, the flask was removed from the oil bath and cooled. The solid was collected on a filter, thoroughly washed and dried, yielding 45.4 grams of solid material. Analysis showed: Al=724 ppm.

The X-ray diffraction pattern of the dried material was determined in accordance with the standard techniques described hereinabove. The major peak observed were those set forth in Table I above.

Thirty grams of the dried material were calcined at 535° C. for 16 hours and then ion-exchanged twice with 60 grams $NH_4Cl$ in 300 ml water at reflux conditions for 4 to 16 hours. The ammonium exchanged material was filtered, washed, and dried. Analysis showed: Al=800 ppm.

Iron impregnation—An aqueous ferric nitrate solution weighing 12 grams and containing 0.41 grams Fe was prepared. The solution was then mixed with 5.44 grams of the $NH_4^+$-ion exchanged sample forming a thin paste which was dried for 17 hours at 105° C. yielding 6.24 g of product. The calculated iron content is 6.6%.

X-ray diffraction patterns of the ammonium exchanged material and the iron impregnated material were substantially the same as that of Table I with some minor shifts in interplanar spacing and variation in relative intensity.

EXAMPLE II

The general procedure of Example I was followed to determine if boron or Group VIII metals could be incorporated into the silicate composition of this invention.

Two hundred sixty grams of water were added to 800 grams of colloidal silica (Ludox AS-40). A second solution containing 300 grams choline chloride, 600 grams water, 64 grams KOH (45.4%) and 112 grams NaOH (50%) was slowly added to the silica solution. After mixing for one hour, the mixture was split into four equal parts, which were then treated as described in Table II below. In three of the four batches, a third solution (composition is listed in the table) was added. The growth mixtures were placed in polypropylene flasks with reflux condensers and partially immersed in a hot oil bath at 120° C. Samples were periodically removed during growth and after 42 days the flasks were cooled and the solids were filtered, washed, and dried. The X-ray diffraction pattern of Batches 1 and 3 were the same as that of Table I, while in Batch 4 those crystalline peaks were just starting to form. Batch 2, with boron, was amorphous.

TABLE II

|  | Batch 1 | Batch 2 | Batch 3 | Batch 4 |
| --- | --- | --- | --- | --- |
| Composition of added solution | None added | 5 g sodium borate in 110 ml water | 5 mls ruthenium sulfite acid (3) + 50 ml water | 3.0 g $FeCl_3.6H_2O$ 5.0 g 8 Hydroxy-quinoline-5-sulfonic acid 2.5 g NaOH 83 water |
| Sample after 14 days |  |  |  |  |
| XRD analysis (1) | Amor. | Amor. Seed with #1 | Amor. Seed with #1 | Amor. Seed with #1 |
| Sample after 28 days | Some XRD peaks | Amor. | Not sampled | Not sampled |
| Remove from oil bath - 42 days | Crystalline | Amor. | Crystalline | Some XRD peaks starting to form |
| Analysis |  |  |  |  |
| Before Ion Exchange |  |  |  |  |
| Al |  |  | 512 ppm |  |
| Ru |  |  | 0.31% |  |
| After Ion Exchange |  |  |  |  |
| Al |  |  | 634 ppm |  |
| Ru |  |  | 0.32% |  |

(1) XRD = X-ray diffraction
(2) Amor. = amorphous
(3) Supplied by Prototech Company, Newton Highland, Mass.
The ruthenium silicate (Batch 3) was ammonium ion exchange using the method described in Example I.

EXAMPLE III

This example illustrates a method of preparing an iron silicate composition of the present invention.

One hundred thirty grams of water were added to 400 grams of colloidal silica (Ludox AS-40 40% $SiO_2$) reducing the silica content to 30% by weight. A solution of 56.0 g of 50% NaOH, 32.0 grams of 45.4% KOH, 300 grams of choline chloride and 300 ml water was slowly added to the silica solution.

A solution of 6.0 g $FeCl_3.6H_2O$ in 54 ml water was added to a second solution containing 10.0 g of 8-hydroxyquinoline-5-sulfonic acid, 10.0 g of 50% NaOH and 100 ml water. The resulting dark mixture was then added to the above stirred silicate. The mixture was placed in a polypropylene flask which was partially immersed in a hot oil bath at 120° C. A reflux condenser was attached to the flask. After 50 days, the flask was removed from the oil bath and cooled. The solid was collected on a filter, thoroughly washed and dried, yielding 51.0 grams of solid material. Analysis showed: Al=245 ppm; Fe=0.26%.

The X-ray diffraction pattern of the dried material was determined in accordance with the standard techniques described hereinbefore. The major peaks observed were those set forth in Table I above.

Thirty grams of the dried material were calcined at 538° C. for 16 hours and then ion-exchanged twice with 60 grams $NH_4Cl$ in 300 ml water at reflux conditions for 4 and 16 hours. The ammonium exchanged material was filtered, washed, and dried. Analysis showed: Al=282 ppm; Fe=0.32%.

A portion (9.1 g) of the ammonium ion exchanged material was slurried with a solution of 10.0 g LiCl in 92 ml water. After refluxing for 3 hours, the mixture was cooled and the solid was washed with water. The solid was then treated a second time with 20.0 g LiCl in 200 ml water at reflux for 18 hours. The solid was then thoroughly washed with de-ionized water until no chloride was detected with silver nitrate. The washed material was dried at 120° C. yielding 8.3 g of solid.

The following analytical data was determined on the lithium exchanged material:

| | |
|---|---|
| Al | 67 μg/g (67 ppm) |
| Fe | 0.17% |
| Li | 325 μg/g (325 ppm) |
| Na | 98 μg/g (98 ppm) |

From these data, the following atomic ratios were calculated:

| |
|---|
| Li/Fe = 1.54 |
| Li/Na = 11.0 |
| Fe/Al = 12.3 |
| $\frac{Li + Na}{Fe + Al} = 1.55$ |

EXAMPLE IV

The crystalline silicate composition of Example I, in its H+ form and impregnated with iron, was evaluated for its catalytic properties.

A. DME Test Data

After H+ exchange the catalyst was tested at 420°–500° C. with 1.5 g DME/g cat./hr. at 6 psig. The predominant products were $CH_4$ and $CH_3OH$ in about 3% yield.

B. Methanol Test Data

Catalyst was in the H+ form and tested with $CH_3OH/N_2$ as shown below:

| Temp. (°C.) | 500 | 300 | 355 | 415 |
|---|---|---|---|---|
| Press. (psig) | 6 | 735 | 735 | 735 |
| Molar Ratio $CH_3OH/N_2$ | 3 | 1 | 1 | 1 |
| Space Vel. ($hr^{-1}$) | 819 | 88 | 97 | 103 |
| % HC Yield (C) | 2 | 1 | 7 | 17 |
| % HC Sel. (C) | | | | |
| $C_1$ | 43 | 100 | 61 | 91 |
| $C_2$ | 29 | 0 | 0 | 9 |
| $C_3$ | 14 | 0 | 1 | 0 |
| $C_4$ | 14 | 0 | 11 | 0 |
| $C_5$ | 0 | 0 | 9 | 0 |
| $C_6$ | 0 | 0 | 18 | 0 |
| Ar. | 0 | 0 | 0 | 0 |
| % Oxy Yield (C) | 42 | 2 | 28 | 65 |
| % Oxy Sel. (C) | | | | |
| DME | 99 | 0 | 2 | 0 |
| CO | 0 | 56 | 89 | 81 |
| $CO_2$ | 0 | 44 | 9 | 19 |
| Other | 1 $CH_3COCH_3$ | 0 | 0 | 0 |

Methanol test results at 6 psig show a low yield of hydrocarbons, but good activity for the formation of DME. Higher pressure increased the hydrocarbon yield, but also increased the decomposition of methanol to CO and $H_2$.

C. Synthesis Gas Test Data

The catalyst of Example I, impregnated with iron (7 wt%), was tested with 1/1 $H_2$/CO at 735 psig and space velocity of about 60 $hr.^{-1}$.

| Temp. °C. | 260 | 310 | 350 |
|---|---|---|---|
| % HC Yield (C) | 3 | 23 | 27 |
| % HC Sel. (C) | | | |
| $C_1$ | 60 | 33 | 54 |
| $C_2$ | 40 | 21 | 4 |
| $C_3$ | 0 | 6 | 5 |
| $C_4$ | 0 | 15 | 15 |
| $C_5$ | 0 | 21 | 19 |
| $C_6$ | 0 | 4 | 3 |
| Ar | 0 | 0 | 0 |
| % Oxy Yield (C) | 1 | 16 | 40 |
| % Oxy Sel. (C) | | | |
| MeOH/DME | — | 3 | 4 |
| $CO_2$ | — | 97 | 95 |
| Other | — | 0 | 1 $C_2H_5OH$ |

EXAMPLE V

The crystalline silicate composition of Example II, prepared with ruthenium (Batch 3), was evaluated for its catalytic properties.

A. DME Test Data

The catalyst was tested in the H+ form with 1.5 g DME/g cat./hr. at 6 psig.

| Temp. | 420 | 500 |
|---|---|---|
| % HC Yield (C) | 6 | 6 |
| % HC Sel. (C) | | |
| $C_1$ | 6 | 51 |
| $C_2$ | 16 | 2 |
| $C_3$ | 26 | 24 |
| $C_4$ | 14 | 20 |
| $C_5^+$ | 38 | 3 |
| Ar | 0 | 0 |

B. CH$_3$OH Test Data

1. Catalyst was in the H$^+$ form and tested with 1 g CH$_3$OH/g cat./hr. and a N$_2$ cofeed.

| Temp. °C. | 500 |
|---|---|
| % HC Yield (C) | 13 |
| % HC Sel. (C) | |
| C$_1$ | 7 |
| C$_2$ | 4 |
| C$_3$ | 0 |
| C$_4$ | 3 |
| C$_{5+}$ | 86 |
| Ar | 0 |
| % Oxy Yield | 8 |
| % Oxy Sel. | |
| DME | 100 |
| Other | 0 |

2. Catalyst in H$^+$ form was tested at 350° C. and 735 psig under conditions shown below:

| Molar Ratio CH$_3$OH:N$_2$:H$_2$O | 1:1:0 | 1:7.4:5.1 | 1:4.6:2.2 | 1:7.8:2.2 |
|---|---|---|---|---|
| SV(hr$^{-1}$) | 104 | 102 | 83 | 112 |
| % HC Yield (C) | 20 | 9 | 10 | 11 |
| % HC Sel. (C) | | | | |
| C$_1$ | 80 | 22 | 57 | 36 |
| C$_2$ | 14 | 4 | 0 | 0 |
| C$_3$ | 0 | 5 | 0 | 0 |
| C$_4$ | 0 | 8 | 0 | 0 |
| C$_5$ | 4 | 19 | 11 | 23 |
| C$_6$ | 1 | 42 | 32 | 41 |
| Ar | 0 | 0 | 0 | 0 |
| % Oxy Yield (C) | 74 | 15 | 23 | 12 |
| % Oxy Sel. (C) | | | | |
| CO$_2$ | 20 | 41 | 40 | 26 |
| CO | 76 | 45 | 46 | 31 |
| DME | 4 | 14 | 14 | 44 |

Methanol was converted to hydrocarbons over the ruthenium containing catalyst, but decomposition was significant, as evidenced by the CO/CO$_2$. The CO$_2$ probably arises from the water gas shift reaction. The addition of water to the feed suppressed decomposition.

C. Synthesis Gas Test Data

The catalyst was in the H$^+$ form and tested at 735 psig with H$_2$/CO/H$_2$O in the ratios given.

| Temp. °C. | 300 | 350 | 350 | 350 | 350 |
|---|---|---|---|---|---|
| H$_2$:CO:H$_2$O | 1:1:0 | 1:1:0 | 1:1:0 | 1:1:1.5 | 1:1:1 |
| Space Vel. (hr$^{-1}$) | 56 | 60 | 104 | 108 | 149 |
| % HC Yield (C) | 5 | 17 | 9 | 0 | 5 |
| % HC Sel. (C) | | | | | |
| C$_1$ | 78 | 75 | 81 | — | 0 |
| C$_2$ | 22 | 25 | 19 | — | 0 |
| C$_3$ | 0 | 0 | 0 | — | 8 |
| C$_4$ | 0 | 0 | 0 | — | 29 |
| C$_5$ | 0 | 0 | 0 | — | 63 |
| Ar | 0 | 0 | 0 | — | 0 |
| % Oxy Yield (C) | 3 | 13 | 5 | 12 | 4 |
| % Oxy Sel. (C) | | | | | |
| CO$_2$ | 95 | 98 | 99 | 60 | 98 |
| CH$_3$OH | 3 | 1 | 1 | 40 | 2 |
| Other | 2 | 1 | 0 | 0 | 0 |

The catalyst above gave unusual product distribution, when water was cofed with the synthesis gas. Apparently, the partial pressure of water is critical for hydrocarbon production. The data at 350° C. and H$_2$:CO:H$_2$O=1:1:1 show hydrocarbon production without methane.

EXAMPLE VI

The crystalline silicate composition of Example III was evaluated for its catalytic properties.

A. DME Test Data

The catalyst was tested in the H$^+$ form with 1.5 g DME/g cat./hr. at 6 psig.

| Temp. | 420 | 500 |
|---|---|---|
| % HC Yield (C) | 12 | 16 |
| % HC Sel. (C) | | |
| C$_1$ | 5 | 49 |
| C$_2$ | 0 | 3 |
| C$_3$ | 1 | 3 |
| C$_4$ | 23 | 22 |
| C$_{5+}$ | 70 | 20 |
| Ar | 0 | 0 |

B. CH$_3$OH Test Data

The catalyst was in the H$^+$ form and tested with 1 g CH$_3$OH/g cat./hr. and a N$_2$ cofeed.

| Temp. °C. | 500 |
|---|---|
| % HC Yield (C) | 2 |
| % HC Sel. (C) | |
| C$_1$ | 66 |
| C$_2$ | 13 |
| C$_3$ | 0 |
| C$_4$ | 21 |
| C$_{5+}$ | 0 |
| Ar | 0 |
| % Oxy. Yield | 18 |
| % Oxy. Sel. | |
| DME | 100 |
| Other | 0 |

C. Synthesis Gas Test Data

The catalyst was tested at 735 psig with H$_2$/CO=2 unless otherwise noted, at a space velocity of about 90 hr$^{-1}$.

| Ion Form | H$^+$ | | | Li$^+$ | | | |
|---|---|---|---|---|---|---|---|
| Temp. °C. | 270 | 325 | 375 | 250 | 300 | 350 | 350* |
| % HC Yield (C) | 4 | 11 | 20 | 3 | 3 | 8 | 2 |
| % HC Sel. (C) | | | | | | | |
| C$_1$ | 83 | 83 | 82 | 0 | 85 | 56 | 86 |
| C$_2$ | 17 | 17 | 18 | 0 | 15 | 15 | 14 |
| C$_3$ | 0 | 0 | 0 | 65 | 0 | 9 | 0 |
| C$_4$ | 0 | 0 | 0 | 35 | 0 | 12 | 0 |
| C$_{5+}$ | 0 | 0 | 0 | 0 | 0 | 8 | 0 |
| Ar | 0 | 0 | 0 | 0 | 0 | 0 | 0 |
| % Oxy. Yield (C) | 0 | 3 | 15 | 0 | 0 | 2 | 4 |
| % Oxy. Sel. (C) | | | | | | | |
| CO$_2$ | — | 97 | 96 | — | — | 95 | 100 |
| Other | — | 3 C$_2$+ C$_3$ ald. | 4 C$_2$+ C$_3$ ald. | — | — | 5 CH$_3$OH | 0 |

*H$_2$/CO/H$_2$O = 2/1/0.8

The Li+ promotes formation of hydrocarbons other than CH$_4$. The addition of H$_2$O in the Li+ catalyst promotes the water gas shift reaction as evidenced by the increased CO$_2$ yield.

What is claimed is:

1. A crystalline silicate composition which is substantially free of aluminum having a composition in terms of mole ratios of oxides as follows:

(0–50) R$_2$O: (0–50) M$_{2/m}$O: (0–30) Z$_{2/z}$O: 100 SiO$_2$: (0–200) H$_2$O where R is the organic nitrogen-containing cation derived from choline, M is an alkali metal cation, ammonium, hydrogen, a metal cation or mixtures thereof, m is the valence of M, Z is a Group VIII metal cation and z is the valence of said Group VIII metal cation, the composition being characterized by the X-ray diffraction pattern set forth in Table I of the specification.

2. A crystalline silicate composition according to claim 1 wherein Z is ruthenium or iron.

3. A crystalline silicate composition according to claim 1 which has undergone ion exchange with ammonium, hydrogen, rare earth metal, a Group VI metal or a Group VIII metal.

4. A crystalline silicate composition according to claim 3 wherein the replacing cation is ammonium or hydrogen.

5. A crystalline silicate composition resulting from heat treating the composition of claim 1 at a temperature of from about 200° to about 900° C.

6. A method of preparing a crystalline silicate composition according to claim 1 which comprises: preparing a mixture containing a choline salt, sodium hydroxide, potassium hydroxide, silica and water, said mixture having an aluminum content of less than about 1000 wppm (based on silica) and having a composition in terms of mole ratios of oxides, falling within the following ranges:

| | |
|---|---|
| OH$^-$/SiO$_2$ | 0.05–3 |
| H$_2$O/OH$^-$ | 10–800 |
| K$_2$O/M$_2$O | 0.01–1 |
| R$^+$/(R$^+$ + M$^+$) | 0.01–1 | where R+ is choline cation and M+ is sodium ion plus potassium ion, maintaining the mixture at a temperature of about 50° to about 250° C., until crystals of said silicate are formed and separating and recovering said crystals.

7. A method according to claim 6 wherein the mixture additionally contains a Group VIII metal salt and the composition has an additional mole ratio range of Z$_{2/z}$O/SiO$_2$ 0–0.3

8. A method according to claim 7 wherein the Group VIII metal is ruthenium or iron.

* * * * *